United States Patent
Heyl et al.

(10) Patent No.: US 11,613,156 B2
(45) Date of Patent: Mar. 28, 2023

(54) COMPACT HEAT EXCHANGER UNIT AND AIR CONDITIONING MODULE PARTICULARLY FOR ELECTRIC VEHICLE

(71) Applicant: Hanon Systems, Daejeon (KR)

(72) Inventors: Peter Heyl, Cologne (DE); Radim Cech, Studenka (CZ); Radek Slavik, Hluk (CZ)

(73) Assignee: HANON SYSTEMS, Daejeon (KR)

( * ) Notice: Subject to any disclaimer, the term of this patent is extended or adjusted under 35 U.S.C. 154(b) by 109 days.

(21) Appl. No.: 17/258,246

(22) PCT Filed: Jul. 2, 2019

(86) PCT No.: PCT/KR2019/008051
§ 371 (c)(1),
(2) Date: Jan. 6, 2021

(87) PCT Pub. No.: WO2020/013506
PCT Pub. Date: Jan. 16, 2020

(65) Prior Publication Data
US 2021/0178853 A1    Jun. 17, 2021

(30) Foreign Application Priority Data

Jul. 9, 2018   (DE) .............. 10 2018 116 550.1
Nov. 27, 2018  (DE) .............. 10 2018 129 988.5

(51) Int. Cl.
*F25B 39/04* (2006.01)
*B60H 1/00* (2006.01)
(Continued)

(52) U.S. Cl.
CPC ..... *B60H 1/00278* (2013.01); *B60H 1/00342* (2013.01); *B60H 1/00392* (2013.01);
(Continued)

(58) Field of Classification Search
CPC ............ B60H 1/00278; B60H 1/32281; B60H 1/00342; B60H 1/00392; B60H 1/3227; B60H 1/3229; B60H 2001/3291; F25B 9/002; F25B 39/02; F25B 39/004; F25B 43/003; F25B 2339/0441; F28D 9/005;
(Continued)

(56) References Cited

U.S. PATENT DOCUMENTS

2006/0053833 A1   3/2006   Martins et al.
2012/0216562 A1   8/2012   Kadle et al.
(Continued)

FOREIGN PATENT DOCUMENTS

DE   202008004582 U1   6/2008
DE   102012113120 A1   4/2014
(Continued)

*Primary Examiner* — Davis D Hwu
(74) *Attorney, Agent, or Firm* — Shumaker, Loop & Kendrick, LLP; James D. Miller

(57) ABSTRACT

A compact heat exchanger unit within an air conditioning apparatus for a vehicle, and a condenser region for the condensation of refrigerant is formed as a heat exchanging surface, and a high-pressure-refrigerant collector region as a refrigerant collector is formed in the integrated form as a plate packet of a heat exchanger within a plate heat exchanger.

15 Claims, 11 Drawing Sheets

(51) Int. Cl.

| | |
|---|---|
| *B60H 1/32* | (2006.01) |
| *F25B 9/00* | (2006.01) |
| *F25B 39/02* | (2006.01) |
| *F25B 43/00* | (2006.01) |
| *F28D 9/00* | (2006.01) |
| *F28D 21/00* | (2006.01) |
| *F28F 3/04* | (2006.01) |

(52) U.S. Cl.
CPC ......... *B60H 1/3227* (2013.01); *B60H 1/3229* (2013.01); *B60H 1/32281* (2019.05); *F25B 9/002* (2013.01); *F25B 39/02* (2013.01); *F25B 39/04* (2013.01); *F25B 43/003* (2013.01); *F28D 9/005* (2013.01); *F28D 9/0093* (2013.01); *F28D 21/00* (2013.01); *F28F 3/044* (2013.01); *F28F 3/046* (2013.01); *F28F 3/048* (2013.01); *B60H 2001/3291* (2013.01); *B60Y 2200/91* (2013.01); *F25B 2339/0441* (2013.01); *F28D 2021/008* (2013.01); *F28D 2021/0043* (2013.01); *F28F 2275/04* (2013.01)

(58) Field of Classification Search
CPC ................... F28D 9/0093; F28D 21/00; F28D 2021/0043; F28F 3/044; F28F 3/046; F28F 2275/04; B60Y 2200/91
USPC .......................................................... 62/509
See application file for complete search history.

(56) References Cited

U.S. PATENT DOCUMENTS

| | | |
|---|---|---|
| 2013/0146257 A1 | 6/2013 | Kim et al. |
| 2015/0377528 A1 | 12/2015 | Andersson et al. |
| 2016/0375745 A1 | 12/2016 | Duerr et al. |

FOREIGN PATENT DOCUMENTS

| | | | | |
|---|---|---|---|---|
| EP | 1241428 A2 | 9/2002 | | |
| EP | 2629040 A2 | 8/2013 | | |
| EP | 2676086 A1 | 12/2013 | | |
| EP | 2878911 A1 | * 6/2015 | ............ | F28D 9/005 |
| EP | 3136034 A1 | 3/2017 | | |
| JP | 2003042597 A | 2/2003 | | |
| JP | 2006162154 A | 6/2006 | | |
| JP | 2012116462 A | 6/2012 | | |
| JP | 2878911 | * 6/2013 | | |
| JP | 2014080174 A | 5/2014 | | |
| JP | 5618368 B2 | 11/2014 | | |
| KR | 0123029 B1 | 11/1997 | | |
| KR | 20000025172 A | 5/2000 | | |
| KR | 101261904 B1 | 5/2013 | | |
| KR | 101461872 B1 | 11/2014 | | |
| KR | 20160129165 | * 11/2016 | | |
| KR | 101822898 B1 | 1/2018 | | |
| WO | 3414021 A1 | 6/1994 | | |
| WO | 2016038830 A1 | 3/2016 | | |
| WO | 2016117069 A1 | 7/2016 | | |

* cited by examiner

COMPACT HEAT EXCHANGER UNIT AND AIR CONDITIONING MODULE PARTICULARLY FOR ELECTRIC VEHICLE

CROSS-REFERENCE TO RELATED APPLICATIONS

This patent application is a United States nation phase patent application based on PCT/KR2019/008051 filed on Jul. 2, 2019, which claims the benefit of German Patent Application No. DE 10 2018 116 550.1 filed on Jul. 9, 2018 and German Patent Application No. DE 10 2018 129 988.5 filed on Nov. 27, 2018, the entire disclosures of which are hereby incorporated herein by reference.

FIELD OF THE DISCLOSURE

The present disclosure relates to a compact heat exchanger unit and an air conditioning module particularly suitable for an electric vehicle due to its own configuration method, compactness, and connection conditions.

The air conditioning module may be understood as an apparatus for generating or providing the heat air and/or the cool air which conditions the air in a vehicle interior, as a portion of the air conditioning unit. The air conditioning module has all important components of a refrigerant circulation system and is designed in a special method to be used in an electric vehicle which preferably has the generally low level of the waste heat temperature and uses an electric compressor.

DESCRIPTION OF THE RELATED ART

In the related art, an air-cooled condenser is mainly used in an air conditioning system for a vehicle. Such a situation is related to the fact in which an air cooler allows the costly favorable possibility of the heat emission for operating cooling equipment.

However, alternatively, a water-cooled condenser of the air conditioning module is also known, such that there appears the possibility capable of designing a smaller condenser cooled with liquid by the higher efficiency when the heat is exchanged by the liquid cooling different from the air cooling.

The disadvantage of the water-cooled condenser in the vehicle air conditioning field is that an additional coolant circulation system causes the consumption of the additional apparatus and the costly consumption due to the consumption of the additional apparatus, and unlike the above, the air-cooled condenser may be determined to be located in parallel with an engine cooler for a combustion engine without consumption of the additional apparatus and operated within the engine chamber.

The disadvantage in the air conditioning system having the water-cooled condenser as well as the air-cooled condenser is that since the integration of the individual components of the air conditioning system is made in various places inside the vehicle, these components may be inevitably, mutually associated with the complicated work sequence partially in the vehicle assembling facility.

Furthermore, there exists the endeavor of those skilled in the art who intends to provide the air conditioning module and the compact heat exchanger unit which may be simply mounted and also simply exchanged or replaced for the repair.

SUMMARY OF THE DISCLOSURE

An object of the present disclosure is to provide an air conditioning module which is particularly suitable for an electric vehicle, and may be simply integrated around the component of the electric vehicle.

Another object of the present disclosure is to provide a compact heat exchanger unit integrating various heat exchanger regions which may be efficiently manufactured in terms of the cost and particularly, space-savingly implemented.

The objects of the present disclosure are solved by an air conditioning module and a compact heat exchanger unit having features as shown and described.

The objects of the present disclosure are particularly solved by a compact heat exchanger unit within an air conditioning apparatus for a vehicle in which a condenser region for the condensation of the refrigerant is formed as a heat exchanging surface, and a high-pressure-refrigerant collector region as a refrigerant collector is formed in the integrated form as a plate packet of a heat exchanger within a plate heat exchanger. Therefore, a refrigerant condensation function and a refrigerant collection function are structurally arranged within one component of the compact heat exchanger unit on the high pressure side of a refrigerant circulation system, and as a result, integrated inside the component. In such a configuration, the compact heat exchanger unit may be particularly, preferably used within the air conditioning apparatus as a condenser cooled with liquid and particularly, cooled with water. The plate heat exchanger is implemented as a plate packet integrated in a region according to the function according to the understanding of the present disclosure. Therefore, the condenser region becomes the region of the heat exchanging surface on which refrigerant is condensed. The condenser region is formed as the plate packet and the heat exchanging surface having the corresponding size, and coupled as one integrated plate heat exchanger commonly together with a plate packet of the high-pressure-refrigerant collector region. The heat exchanger plate of the plate packet may be implemented by having a rib or a thin plate for improving the heat exchanging characteristics.

The special advantage is that the high-pressure-refrigerant collector region also referred to as a receiver is structurally integrated within the compact heat exchanger unit. The receiver is preferably arranged just after the condenser region within the refrigerant circulation system, and an excess cooling section for condensate according to another preferred exemplary embodiment is connected after the receiver.

Preferably, the high pressure side of an internal heat exchanger is connected to the excess cooling section. A relaxation engine, an evaporator, and the low pressure side of the internal heat exchanger arranged within the component of the compact heat exchanger unit or alternatively, outside the compact heat exchanger unit are continuous within the refrigerant circulation system as further described in the following exemplary embodiments.

As described above, in the configuration of the compact heat exchanger unit having the condenser region, the excess cooling region, the high-pressure-refrigerant collector region, and the internal heat exchanger region, the high-pressure-refrigerant collector region is alternatively, preferably implemented as a separate high-pressure-refrigerant collector.

Particularly, preferably, a separate excess cooling region for the excess cooling of refrigerant is formed in the state of being connected after the condenser region, and integrated within the compact heat exchanger unit as an additional plate packet.

The condenser region, the excess cooling region, and the high-pressure-refrigerant collector region are preferably arranged in parallel with each other, and in this case, these regions are implemented as the plate packets of the plate heat exchanger. The refrigerant first reaches the condenser region, and reaches the high-pressure-refrigerant collector region through the direct connection therefrom. The refrigerant is collected in the high-pressure-refrigerant collector region and then guided to the excess cooling region.

Alternatively, the plate packet of the high-pressure-refrigerant collector region is arranged between the plate packet of the condenser region and the plate packet of the excess cooling region within the plate heat exchanger.

Preferably, the high-pressure-refrigerant collector region of the compact heat exchanger unit is formed to be charged and empty from the bottom. According to the present exemplary embodiment, the high-pressure-refrigerant collector region is filled with liquid refrigerant from the bottom to the top, and in this case, the liquid refrigerant is also discharged from the bottom and guided into the excess cooling region.

According to one preferred exemplary embodiment, the evaporator region, the internal heat exchanger region, and the condenser region are formed as the plate packets, and arranged in the state of being integrated within the integrated plate heat exchanger. Such a configuration is complemented by the high-pressure-refrigerant collector region in some cases, such that the compact heat exchanger unit has all of heat exchanging functions of a cooling equipment circulation system and additionally has the collection function in some cases. A high function integration rate particularly allows the space-saving structure scheme of the air conditioning module.

Alternatively to this, the high-pressure-refrigerant collector region is implemented as a separate high-pressure-refrigerant collector.

Preferably, a refrigerant filter and/or a dryer and an expansion engine are integrated inside the compact heat exchanger unit.

To guarantee the best efficiency of the circulation system from a thermodynamic point of view, the individual heat exchanger region and function region are preferably formed in the state of being thermally insulated from each other at different temperature levels by the insulation plates between the regions. According to the application, the temperature level, and the space situation, at least two or more regions are thermally insulated from each other by the insulation plate. In this case, to minimize the heat passing process passing the insulation plate from one region to another region, the insulation plate may be formed as the plate which does not flow the heat through, or is filled with air or nitrogen, in the vacuum state.

According to one preferred exemplary embodiment of the present disclosure, delivery channels as the plate packet of the plate heat exchanger for guiding refrigerant from the lower surface of the compact heat exchanger unit to the upper surface thereof are arranged between the heat exchanger regions of the compact heat exchanger unit and/or the function region. In this case, the delivery channel is composed of one or more plates, and may vertically guide the refrigerant between two regions, and as a result, the refrigerant may be, for example, collected on the bottom in one region, guided upward through the deliver channel, and then distributed from the top in the neighboring region again.

Particularly, according to one preferred exemplary embodiment of the compact heat exchanger unit, the refrigerant is not collected and distributed on the same side within the individual region and rather, exists for the case of being performed on the side facing the compact heat exchanger unit. In this case, the refrigerant may be inevitably guided from the lower surface of the condenser region to the upper surface of the high-pressure-refrigerant collector region or the excess cooling region, for example. Preferably, such a process is also referred to as a collector channel and performed through the described delivery channel integrated inside the compact heat exchanger unit, the collector channel is implemented as a delivery plate within the plate heat exchanger, and within the collector channel, the refrigerant is guided from the bottom to the top within the cavity having the channel form or in some cases, by being bypassed in another method.

According to the heat exchanging object and wiring of the regions of the compact heat exchanger unit, the refrigerant may be also guided from the bottom to the top or reversely inside the plate heat exchanger through the integrated delivery plate.

Generally, the refrigerant flow and the coolant flow may be formed by a single passing design or a multiple passing design.

In terms of the manufacturing technology, the individual region and the plate packet are preferably soldered together.

Particularly, the objects of the present disclosure are solved by the air conditioning module suitable for the electric vehicle, particularly, by its own compact structure. The air conditioning module has a refrigerant circulation system which is fully closed inside the air conditioning module, and in this case, if a connection line and the compressor as a closed compressor are correspondingly implemented, a refrigerant connection part needs not to be formed between the components of the refrigerant circulation system when the air conditioning module is to be mounted to the vehicle.

The air conditioning module has two connection parts for a coolant circulation system used for supplying coolant to an air conditioning unit. Further, the air conditioning module has two connection parts for the coolant circulation system used for cooling the refrigerant. The refrigerant circulation system has one or more compressors, an expansion engine, and two or more heat exchangers for evaporating and condensing the refrigerant. As the special method, the air conditioning module is formed in the form in which the heat exchanger is integrated within the compact heat exchanger unit as the heat exchanger region. In this case, the compact heat exchanger unit is formed as the integrated plate heat exchanger composed of a plurality of plate packets.

According to the concept of the present disclosure, the individual heat exchanger is not implemented as a separate component of the refrigerant circulation system, and rather, implemented in the form integrated within the integrated plate heat exchanger forming the core of the air conditioning module. Therefore, as a result, the refrigerant connection part may be manufactured between the individual components of the refrigerant circulation system inside the air conditioning module in advance. The air conditioning module has the coolant circulation system and a forward flow connection part and a backward flow connection part for the coolant circulation system, respectively, which should be continuously connected when mounted in the vehicle.

Therefore, particularly, the concept of the component, which is safe to the leakage and has compact and space-saving structure by integrating the heat exchanger within the compact heat exchanger unit, is implemented. As a result, less refrigerant charging amount is implemented in the state where the leakage risk is strongly reduced.

Therefore, the compact heat exchanger unit is formed by a small number of partitions separated functionally and according to the temperature range. These partitions are structurally integrated within the lower unit of the air conditioning module of the compact heat exchanger unit.

Alternatively, the high-pressure-refrigerant collector region is implemented as a separate container or the bottle according to the related art, and integrated within the air conditioning module next to the compact heat exchanger unit. Even in the present exemplary embodiment, to implement the assembling, which is simple, costly advantageous, and has no error even in the modified example of the present shape, the refrigerant connection part may be formed with rigidity or in the form of being previously manufactured.

Preferably, the additional components of the refrigerant circulation system are directly integrated within the compact heat exchanger unit. These additional components are a filter for refrigerant and/or a dryer for refrigerant and/or an expansion engine, which are formed in the form of being directly integrated within the compact heat exchanger unit, for example.

Alternatively, these components are arranged outside the compact heat exchanger unit.

The integration of functionally different regions of the compact heat exchanger unit—if these regions are formed in the state of being insulated from each other—is thermodynamically performed without the disadvantage compared to the method of separately forming the components. Therefore, one insulation plate of the plate heat exchanger is arranged between the individual regions, respectively, such that the individual regions are formed in the state of being arranged to be spaced apart from each other and the state of being thermally insulated from each other. The insulation plate may be correspondingly omitted as long as the neighboring regions may not have the significant temperature difference.

In terms of the manufacturing technology, particularly, preferably, the regions of the compact heat exchanger unit are soldered together, such that as a result, various circulation system, that is, the refrigerant circulation system as well as coolant or water circulation system for coolant is implemented to be particularly safe to the leakage for each other and also the surroundings by the soldering of the individual plate, the plate packet, and the region.

The heat exchanging characteristics of the compact heat exchanger unit are that the plate of the plate heat exchanger preferably has ribs, and these ribs are formed by an offset-design, a dimple-design, or a chevron-design, and in this case, the rib by the offset-design is implemented as an insertion plate between two plates.

In this case, the plate of the plate heat exchanger within the high-pressure-refrigerant collector region preferably has the rib as an insertion part formed by the offset-design, and in this case, the insertion part has a recess for enlarging the volume of the high-pressure-refrigerant collector region, and the recess has a grain structure, a fir structure, or a long hole structure. To reach the pressure-resistant shape as possible, the insertion parts are connected to the plates through a plurality of contact points.

Preferably, the characteristics are further improved by replacing the structure of the insertion part having the recess for enlarging the volume of the high-pressure-refrigerant collector region for improving the pressure strength if the plates are arranged in parallel with each other. Therefore, the structure and the pattern overlap with each other, and as a result, the connection part between the insertion parts are formed on various planes, and such a situation causes the improved distribution of the points for the connection part, and implements the entire structure more evenly.

Preferably, the plates of the plate heat exchanger within the internal heat exchanger region are implemented by having ribs formed by the dimple-design on the low pressure side of the refrigerant circulation system, and the rib is implemented as the insertion part formed by the offset-design on the high pressure side.

The plates of the plate heat exchanger within the condenser region and the excess cooling region preferably have the ribs as the insertion part formed by the offset-design and/or implemented as the rib formed by the chevron-design, and the reason is because such a design is better suitable for the high pressure.

Unlike the above, the plates of the plate heat exchanger within the evaporator region preferably have the ribs formed by the dimple-design, and the reason is because such a design is suitable for a lower pressure.

The plate packets of the region of the compact heat exchanger unit for flowing through fluid is formed as channels within a section having a double, triple, or quadruple pipe. These channels may flow through the fluid inside the compact heat exchanger unit. Such a flowing-through method is preferable in the exemplary embodiments of the compact heat exchanger unit in which the plate packets are arranged in parallel with each other, for example, but the fluid guide first jumps over the packet and then is finally guided inversely into the packet in which the fluid jumps over.

According to another preferred exemplary embodiment, a refrigerant dryer is provided, and also integrated within the plate of the plate heat exchanger. Alternatively to this, the dryer is implemented as the element to be separately completed and assembled on the refrigerant outlet of the compact heat exchanger unit formed as the plate heat exchanger.

Particularly, preferably, the use of the waste heat of the air conditioning module may be implemented by being performed in the state where the coolant circulation system of the condenser for supplying heat to the air conditioning unit is connected. In this case, the condensation heat of the refrigerant may be used as the valid heat for heating the vehicle interior as necessary inside the air conditioning unit. Preferably, the compressor is implemented as an electric compressor, such that the air conditioning module has only one electric connection part which may be assembling-friendly implemented.

As the refrigerant, the flammable or toxic refrigerant, such as R134a, R152a, R1234yf, R1234ze, R744, propane, propylene, or ammonia, which may be characterized by having less global warming potential (GWP) and thus, preferably used in the future is preferably used within the refrigerant circulation system.

Preferably, the coolant circulation system of the air conditioning module has a low-temperature heat exchanger, and the low-temperature heat exchanger discharges the heat of a relatively lower temperature level from the condensation of the refrigerant to the surroundings through the low-temperature heat exchanger.

Particularly, preferably, the coolant circulation system—as long as the vehicle is implemented as the electric vehicle—is connected to the battery cooling circulation system in series or in parallel next to the air conditioning unit. Therefore, the coolant provided by the air conditioning module may be used for the cooling of a battery within one common battery cooling circulation system.

Alternatively to this, the battery cooling circulation system is formed in the state of being connected to the evaporator region of the compact heat exchanger unit in parallel or in series inside the refrigerant circulation system. In this case, the refrigerant is used for directly cooling the battery or the battery cooling circulation system.

Particularly, according to one preferred exemplary embodiment of the present disclosure, the components of the refrigerant circulation system may be formed such that the refrigerant circulation system may also be operated even in a heat pump mode.

Particularly, in the preferred method, compact components provided with only four water connection parts and only one current connection part are provided by the air conditioning module according to the present disclosure. The refrigerant circulation system is connected to the compressor and the additional component on the refrigerant side and completely closed, such that as a result, the air conditioning module not guiding the refrigerant at all may be inevitably closed inside the refrigerant circulation system when the air conditioning module is assembled within the vehicle. Therefore, the air conditioning module may be simply mounted, but requires only a relatively smaller refrigerant charging amount. The process of integrating the heat exchanger region into the compact heat exchanger unit may be economically advantageous in the situation where the risk of leakage is low, and the reason is because the connection line may be implemented with rigidity, thereby reducing the leakage possibility.

In summary, the compact heat exchanger unit is preferably used between the regions within the refrigerant circulation system of the air conditioning apparatus for the vehicle as the component of the water-cooled condenser in which the receiver and/or the condensation and/or the excess cooling and the insulation are integrated. In this case, the component may be implemented by having the insulation part between the internal heat exchanger and/or the regions. Furthermore, the components are preferably implemented by having the insulation part between the internal or external expansion apparatus and/or the regions. According to one improvement of the components, the components are implemented by having the insulation part between the evaporator and/or the regions.

BRIEF DESCRIPTION OF THE DRAWINGS

The additional details, features, and advantages of the present disclosure are described in detail from the following description for the exemplary embodiments described with reference to the corresponding drawings. Here.

DESCRIPTION OF SPECIFIC EMBODIMENTS

Figure 1:
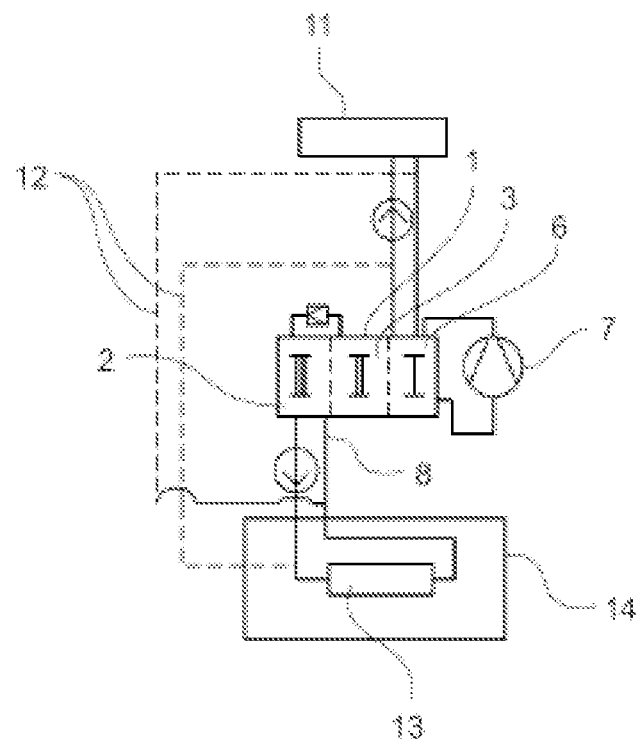
FIG. 1 illustrates a circuit diagram of an air conditioning module having a compact heat exchanger unit.

FIG. 1 illustrates a circuit diagram of an air conditioning module, and a compact heat exchanger unit 1 is formed on the center of the air conditioning module. The compact heat exchanger unit 1 is divided into three heat exchanger regions indicated by Roman symbols in the present drawing. The division is specifically relevant to an evaporator region 2 (III), an internal heat exchanger region 3 (II), and a condenser region 6 (I). These heat exchanging function regions inside a refrigerant circulation system is integrated within one compact heat exchanger unit 1. The compact heat exchanger unit 1 is configured as a plate heat exchanger composed of a small number of heat exchanger plates. The individual regions are formed by a plurality of plates integrated by one plate packet.

As a result, the plate packets of the individual function region is integrated within one plate heat exchanger formed as an integrated component.

The condenser region 6 is formed as the condenser cooled with liquid or cooled with water inside the compact heat exchanger unit 1.

An expansion apparatus may be arranged between 1 (II) and 2 (III) or separately within the component.

The refrigerant circulation system of the air conditioning module includes general components, that is, a compressor 7, the condenser region 6, the internal heat exchanger region 3, specifically, an expansion engine (not illustrated) and the evaporator region 2. The refrigerant circulation system is connected to the compressor 7 through the internal heat exchanger region 3 in the general method after the evaporator region 2. A circuit of the refrigerant circulation system illustrated in the drawing includes a functional region for the internal heat exchanger, and the functional region needs not to be used for all refrigerants in each design, thereby having the alternative characteristics inside the refrigerant circulation system. The internal heat exchanger region 3 is preferably connected as an excess cooling counter flow machine, and also referred to as an IHX.

The air conditioning module supplies the cool air to the vehicle, and in some cases, supplies the heat air, and in this case, a coolant circulation system 8 having a pump (not specifically illustrated) within the cooling equipment circuit is delivered to an air conditioning unit 14 from the evaporator region 2 and to a cooler/a heater 13 from the air conditioning unit 14. If the coolant circulation system 8 is operated, the heat exchanger of the air conditioning unit 14 is operated as the cooler 13 within the cooling equipment circuit. In the vehicle operation state requiring the addition heating, the air conditioning unit 14 receives the heat through a coolant circulation system 12, such that as a result, in this case, the heat exchanger of the air conditioning unit 14 is operated as the heater 13. The coolant circulation system 12 absorbs the heat of the refrigerant circulation system from the condenser region 6 during operation, and discharges the heat to the surroundings through a low-temperature heat exchanger 11, for example.

Figure 2:
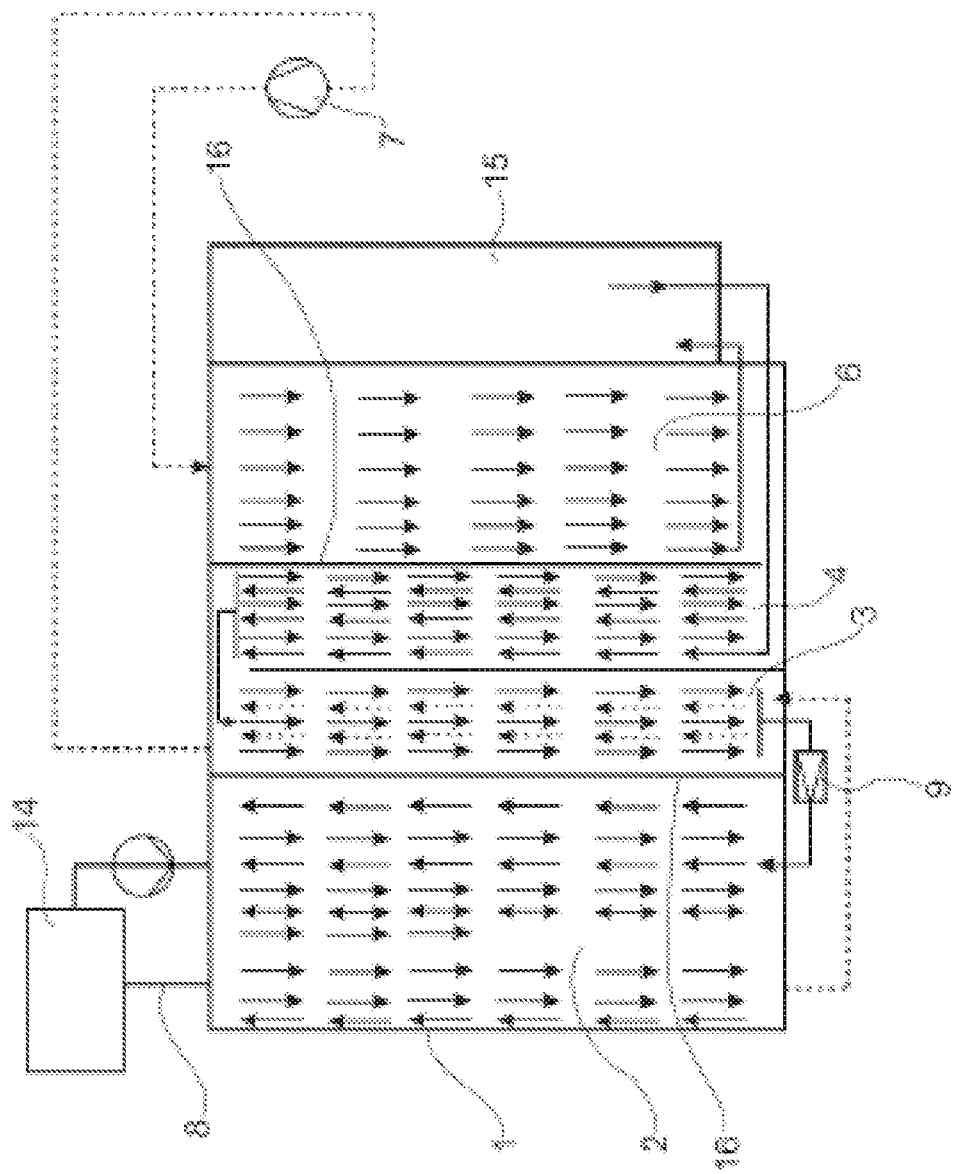
FIG. 2 illustrates the compact heat exchanger unit having a separate high-pressure-refrigerant collector.

FIG. 2 illustrates the air conditioning module having the compact heat exchanger unit 1 using a separate high-pressure-refrigerant collector 15. The compact heat exchanger unit 1 includes four heat exchanger regions functionally separated in the illustrated exemplary embodiment. The heat exchanger regions are the evaporator region 2, the internal heat exchanger region 3, and the condenser region 6 illustrated in the drawing equivalent to FIG. 1. As an additional functional region for heat exchange, an excess cooling region 4 is formed in the state of being functionally separated as the unique region of the compact heat exchanger unit 1. These regions are insulated from each other, and separated by insulation plates 16 arranged between these regions. A fluid connection part is integrated between the individual regions connected to each other in order inside the compact heat exchanger unit 1, such that as a result, connection lines disposed outside may not be shown between the functional regions of the compact heat exchanger unit 1 in the preferred method. The large advantage provided by such a situation is that the leakage risk is remarkably lowered by the short connection lines integrated within the compact heat exchanger unit 1, and furthermore, the very assembling friendly compact heat exchanger unit 1 may also be provided inside the air conditioning module. The high-pressure-refrigerant collector 15 also referred to as a receiver is arranged within the refrigerant circulation system. The high-pressure-refrigerant collector 15 is formed in the general method as a separate component having a bottle form in the schematic diagram illustrated in FIG. 2. The refrigerant circulation system is completed by the compressor 7 and the expansion engine, and the expansion engine is arranged as an expansion valve 9 between the internal heat exchanger region 3 and the evaporator region 2. The refrigerant connection line and the expansion valve 9 are also integrated compactly within the compact heat exchanger unit 1 in the special method. The air conditioning unit 14 receives coolant for conditioning the air of the vehicle interior through the coolant circulation system 8 having a coolant pump (not specially illustrated in the drawing) from the evaporator region 2.

Figure 3:
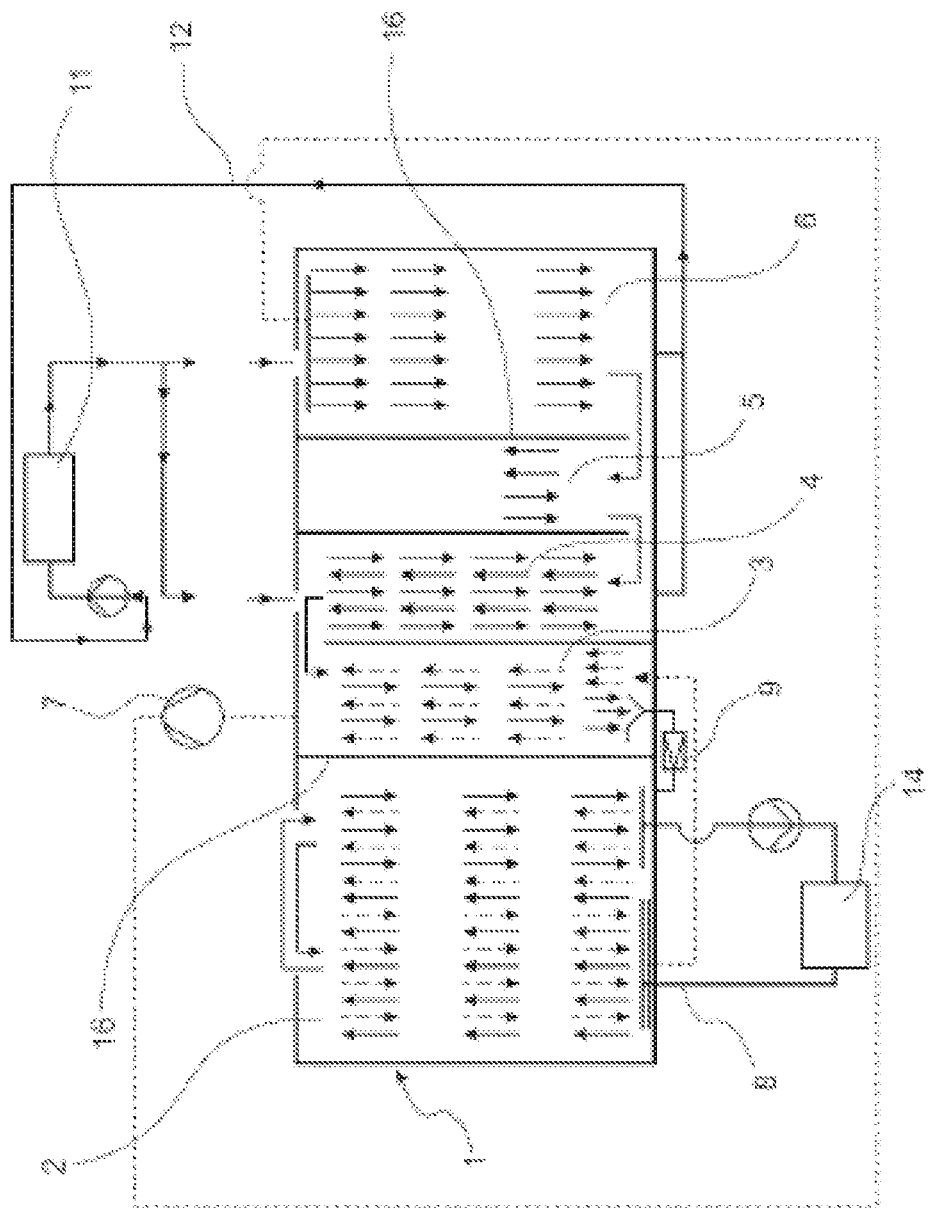
FIG. 3 illustrates the air conditioning module having heat exchanger regions or an integrated high-pressure-refrigerant collector inside the compact heat exchanger unit.

FIG. 3 illustrates the air conditioning module having an additional functional region inside the compact heat exchanger unit 1. In this case, to functionally complement and structurally form the air conditioning module illustrated in FIG. 2, the functional region of the high-pressure-refrigerant collector as the high-pressure-refrigerant collector region 5 is also formed in the state of being integrated within the compact heat exchanger unit 1. To mutually insulate the heat exchanger regions operated at different temperature levels, the insulation plates 16 are arranged between the functional regions again.

Unlike the content illustrated in FIG. 2, FIG. 3 also illustrates the coolant circulation system 12 having the low-temperature heat exchanger 11, and the coolant circulation system connects the condenser region 6 and the excess cooling region 4 inside the coolant circulation system 12 to the low-temperature heat exchanger 11.

Figure 4:
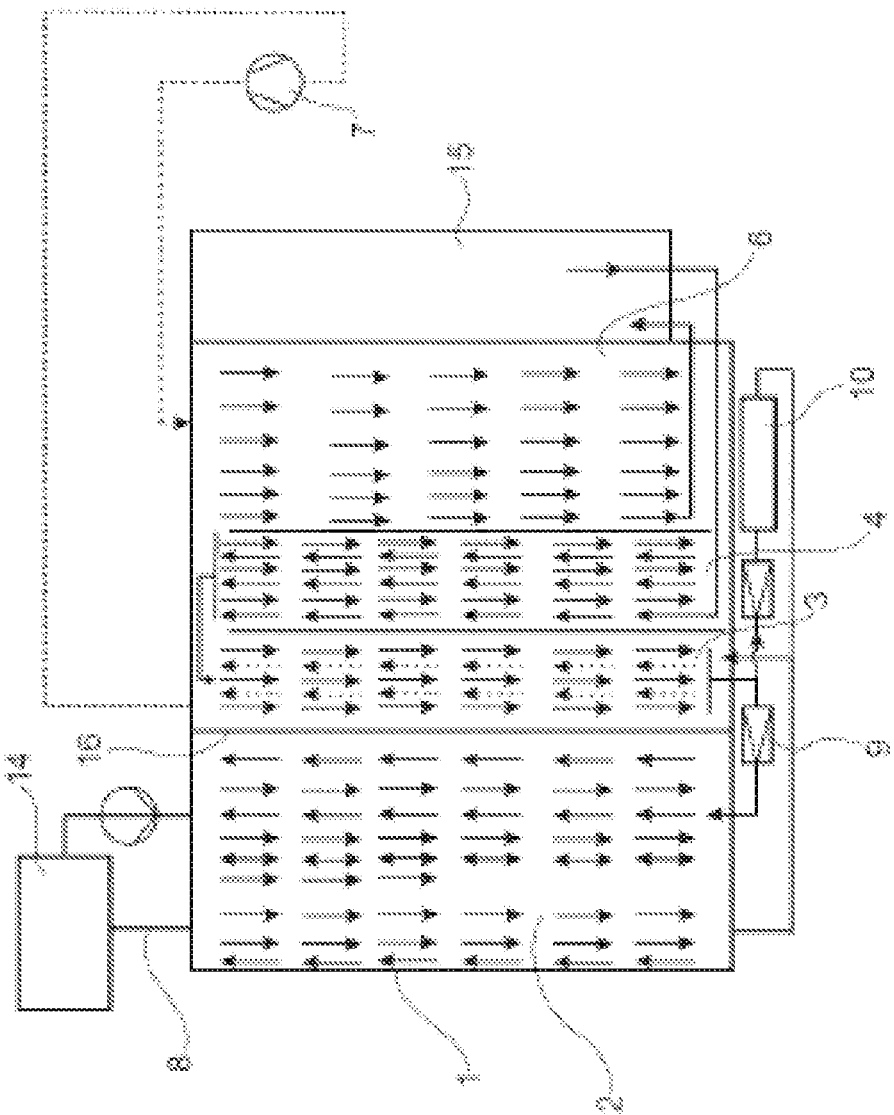
FIG. 4 illustrates the air conditioning module having the compact heat exchanger unit and directly performing battery cooling.

Lastly, FIG. 4 illustrates the air conditioning module having the compact heat exchanger unit 1 operated by the separate high-pressure-refrigerant collector 15 similar to FIG. 2 in the configuration of the compact heat exchanger unit 1. According to the exemplary embodiment illustrated, a battery cooling circulation system 10 is additionally provided, and the additional battery cooling circulation system may directly cool the battery for the electric vehicle according to a vehicle control demand condition using refrigerant. The air conditioning unit 14 having the coolant circulation system 8 is schematically illustrated, whereas the coolant circulation system is not explicitly illustrated in FIG. 4.

Alternatively, with respect to the direct cooling of the battery by the refrigerant circulation system, the battery may also be indirectly cooled by the coolant circulation system 8.

However, ultimately, it is particularly preferable to form the air conditioning module by the assembling friendly implementation having only the connection part for two water circulation systems having one supplying part and one discharging part, respectively, and an electric connection part for the electric compressor.

Figure 5:
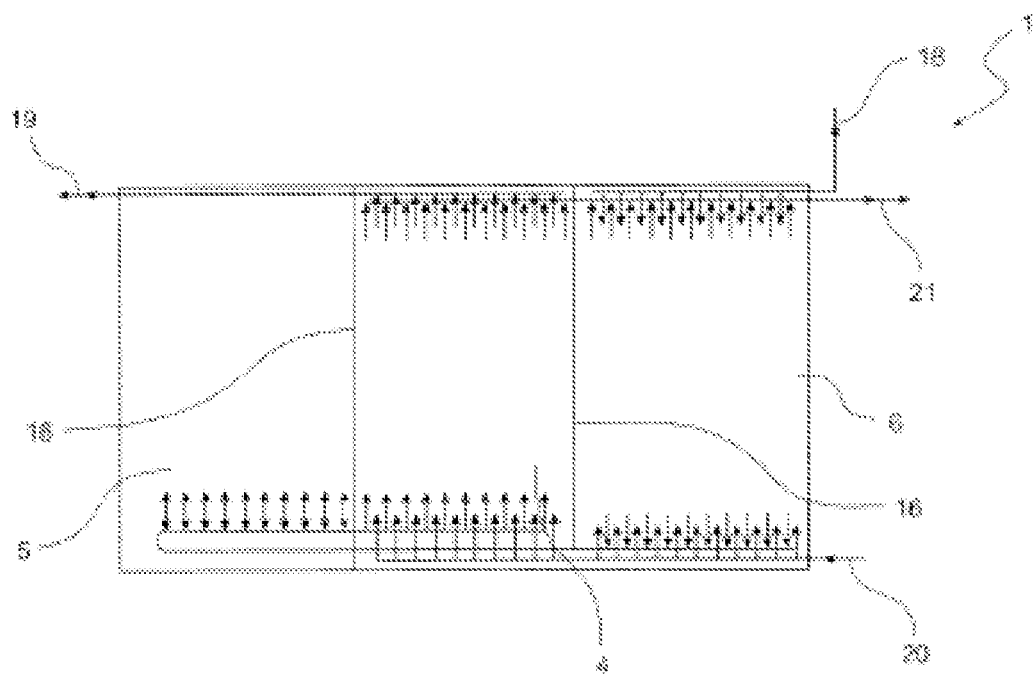
FIG. 5 illustrates the compact heat exchanger unit having the high-pressure-refrigerant collector region.

FIG. 5 illustrates the compact heat exchanger unit 1 composed of three plate packets. One plate packet is formed by the condenser region 6, the other one plate packet is formed by the excess cooling region 4, and the plate heat exchanger is complementarily formed by the plate packet of the high-pressure-refrigerant collector region 5. The individual plate packets are thermally insulated from each other by the insulation plate 16, respectively. Two heat exchanger regions, the condenser region 6, and the excess cooling region 4 operates as the condenser cooled with water or cooled with liquid and as the excess cooler. The refrigerant is inserted into the condenser region 6 from a refrigerant inlet 18 in the high-pressure state at the head of the top, and thereunder, flows in the flowing direction opposite to the coolant introduced into the condenser region 6 from the bottom at the coolant inlet 20. The condensed refrigerant reaches the high-pressure-refrigerant collector region 5 from the bottom of the condenser region 6 to the inside of the refrigerant line integrated perpendicular to the bottom inside the compact heat exchanger unit, and is discharged upward from the line, thereby filling the high-pressure-refrigerant collector region 5 from the bottom. The liquid refrigerant is guided to the neighboring excess cooling region 4 from the high-pressure-refrigerant collector region 5, the liquid refrigerant is discharged on the bottom of the plate packet in the excess cooling region and flows toward the end of the head of the excess cooling region 4 in the top direction, and the liquid refrigerant is discharged from the end of the head of the excess cooling region 4 through a refrigerant outlet 19 in the high-pressure state. In the excess cooling region 4, the coolant flows from the bottom to the top, thereby flowing in the opposite direction of the refrigerant, and flows together with the coolant from the condenser region 6 up to the coolant outlet 21 through the coolant line corresponding to the end of the head. Therefore, the compact heat exchanger unit 1 is formed as the condenser cooled with water in a first stage, and the condenser is combined with the high-pressure-refrigerant collector region 5 also referred to as the receiver. The integration of the receiver into the condenser cooled with water may induce the preferred space saving, and may be also applied with a module method for reducing the refrigerant connection and the coolant connection between the individual components. The entire volume and cost may be saved by two measures.

Various forms of ribs are used within the plate packet within the compact heat exchanger unit 1. These ribs are formed by various designs, and for example, formed by an offset-design, a dimple-design, or a chevron-design. These designs may be combined, and for example, the rib may be implemented as an offset pin or a chevron pin on the high-pressure side and as a dimple design on the low-pressure side. Within the integrated high-pressure-refrigerant collector region 5, to have the refrigerant storage volume as large as possible, an offset pin channel may be formed as the recess formed in the circular shape or the long hole shape or by a snake design or a fir design. To enhance the stability of the components, the design of the rib within the integrated high-pressure-refrigerant collector region 5 may be replaced.

Figure 6:
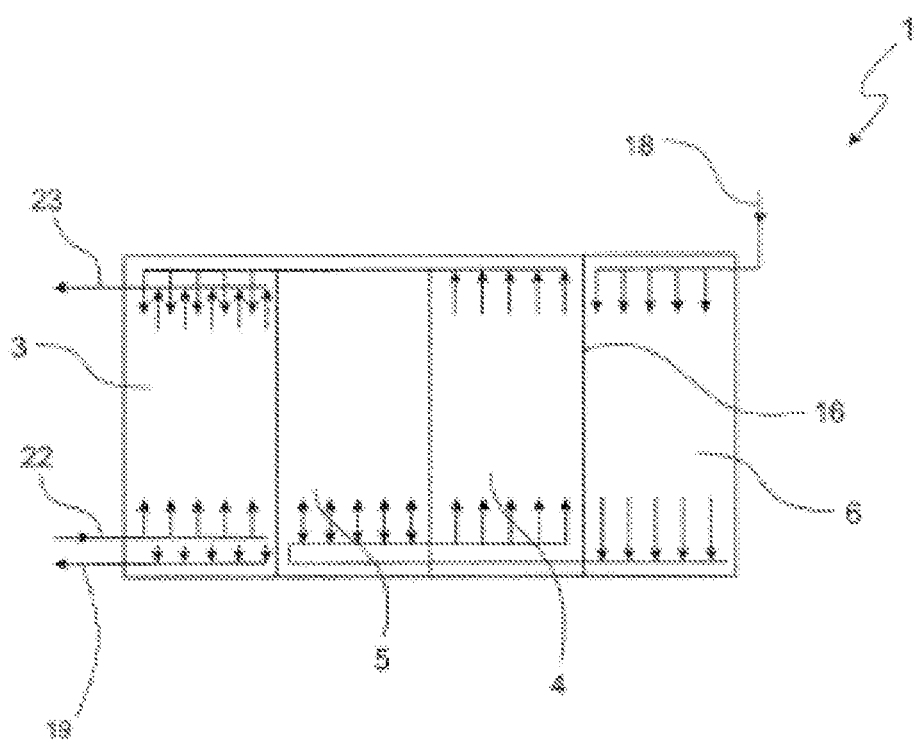
FIG. 6 illustrates a condenser cooled with liquid in which the internal heat exchanger and the high-pressure-refrigerant collector region are integrated.

FIG. 6 illustrates the condenser cooled with liquid having the internal heat exchanger as the compact heat exchanger unit 1. The plate heat exchanger as the compact heat exchanger unit 1 is complemented by the internal heat exchanger region 3 as the plate packet now in FIG. 6 differently from the exemplary embodiment illustrated in FIG. 5. Complementarily with respect to the function method and formation method illustrated in FIG. 5, a refrigerant inlet 22 in the low-pressure state is arranged on the bottom of the internal heat exchanger region 3, and a refrigerant outlet 23 in the low-pressure state is arranged on the end of the head of the internal heat exchanger region 3 for the internal heat exchanging from the high-pressure region of the refrigerant circulation system to the low-pressure region thereof according to the function by the internal heat exchanger region 3 of the compact heat exchanger unit 1. In the present exemplary embodiment of the excess cooling counter flow, the refrigerant flow is implemented in the opposite directional flow. To this end, the refrigerant from the excess cooling region 4 is directly guided to the end of the head of the internal heat exchanger region 3 from the end of the head, and discharged from the compact heat exchanger unit 1 through the refrigerant outlet 19 in the high-pressure state on the bottom. In such a second stage, the condenser cooled with water is now extended to the compact heat exchanger unit 1 by the integration of the internal heat exchanger and the integration of the receiver and in some cases, also by the integration of a dryer 24. Except for the evaporator, all of the heat exchanger regions of the refrigerant circulation system is now integrated inside the compact heat exchanger unit 1.

Preferably, according to the application field and the structural implementation of the air-conditioning apparatus within the vehicle, the evaporator region (not illustrated in the drawing) is integrated to form the cool air inside the compact heat exchanger unit 1.

Figure 7:
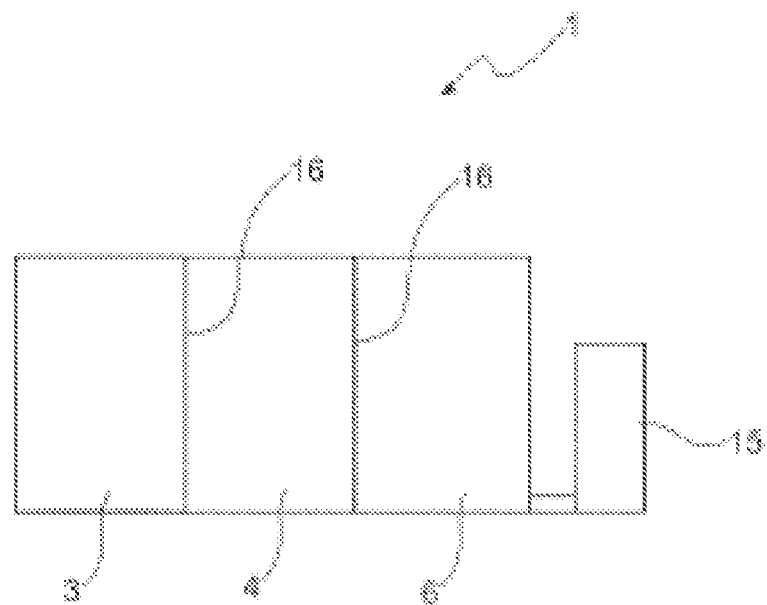
FIG. 7 illustrates the condenser cooled with liquid having an external high-pressure-refrigerant collector.

FIG. 7 illustrates an alternative exemplary embodiment for the condenser illustrated in FIG. 6. In this case, the compact heat exchanger unit 1 is composed of the condenser region 6, the excess cooling region 4, and the internal heat exchanger region 3 in which the regions 6, 4, 3 are thermally insulated from each other by the insulation plate 16. The high-pressure-refrigerant collector 15 is implemented as an external collector unlike the exemplary embodiment illustrated in FIG. 6.

Figure 8:
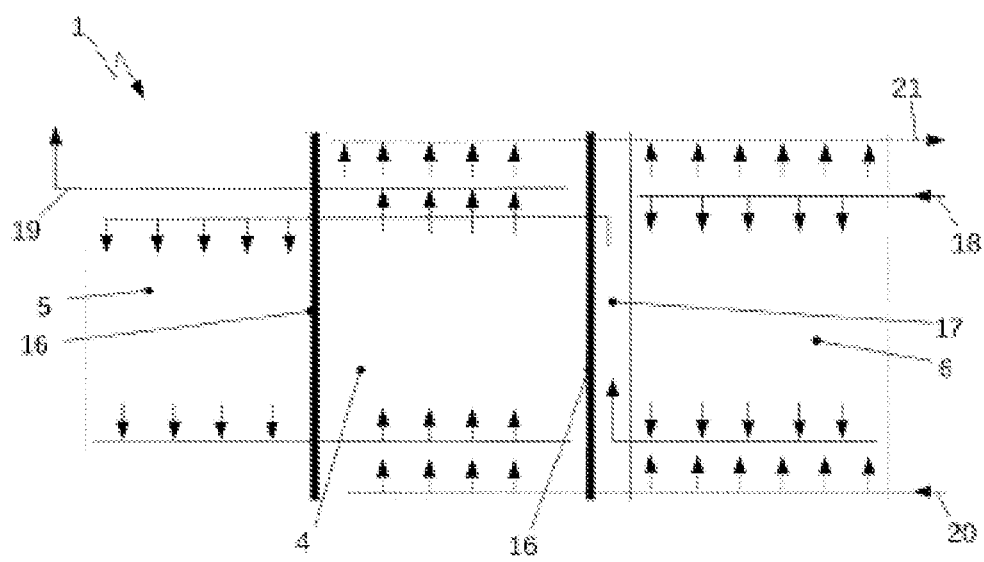
FIG. 8 illustrates the compact heat exchanger unit having a delivery channel.

FIG. 8 illustrates the compact heat exchanger unit 1 having two heat exchanger regions and one functional region as the collector region for refrigerant similar to the exemplary embodiment illustrated in FIG. 5. The condenser region 6, the excess cooling region 4, and the high-pressure-refrigerant collector region 5 are arranged in parallel with each other as the plate packet, and integrated as one plate heat exchanger. A delivery channel 17 is formed between the condenser region 6 and the excess cooling region 4, and within the delivery channel, the refrigerant is guided from the lower surface of the compact heat exchanger unit 1 to the upper surface of the compact heat exchanger unit 1. In this case, the refrigerant is accommodated and collected in the lower portion of the heat exchanger region and delivered to the inside of the delivery channel 17 neighboring horizontally, and within the delivery channel, the refrigerant is delivered to the upper region of the compact heat exchanger unit 1 vertically and upward. In the upper region, the refrigerant is delivered toward a distributor within the horizontally corresponding heat exchanger region, and in the present case, distributed to the upper region within the high-pressure-refrigerant collector region 5. The delivery channel 17 is formed in the form of being thermally insulated by the insulation plate 16 toward the neighboring excess cooling region 4, and unlike the above, the insulation plate 16 is not arranged toward the condenser region 6 at all. Within the compact heat exchanger unit 1 illustrated, the introduction of the refrigerant into the condenser region 6 is made in the upper region of the head of the plate heat exchanger. The refrigerant is collected in the lower region and vertically guided to the upper region through the delivery channel 17, and in the upper region, the refrigerant is horizontally guided into the high-pressure-refrigerant collector region 5, and distributed in the high-pressure-refrigerant collector region 5. In the lower region of the high-pressure-refrigerant collector region 5, the refrigerant is collected and horizontally guided to the lower region of the excess cooling region 4, and in the lower region, the refrigerant is distributed to leave the compact heat exchanger unit 1 through the refrigerant outlet 19 in the upper region. The coolant, generally, water or water-glycol-mixture is supplied to the compact heat exchanger unit 1 through the coolant inlet 20 configured in the lower regions of the condenser region 6 and the excess cooling region 4, and collected in the upper region of the heat exchanger regions to be discharged through the coolant outlet 21. The principle of the delivery channel 17 uses the heat exchanger plate region to vertically deliver the fluid from the bottom of one region to the head of another region, and in this case, the refrigerant or the coolant may also be delivered within the delivery channel. At this time, the heat exchanger plate region may be reduced to one heat exchanger plate according to the necessary volume flow. According to the use example, to avoid the thermodynamical disadvantage by the heat delivery from the delivery channel 17 to the neighboring region, the heat exchanger plate for the delivery channel 17 should be limited by the insulation plate 16 on the side surface thereof.

Figure 9:
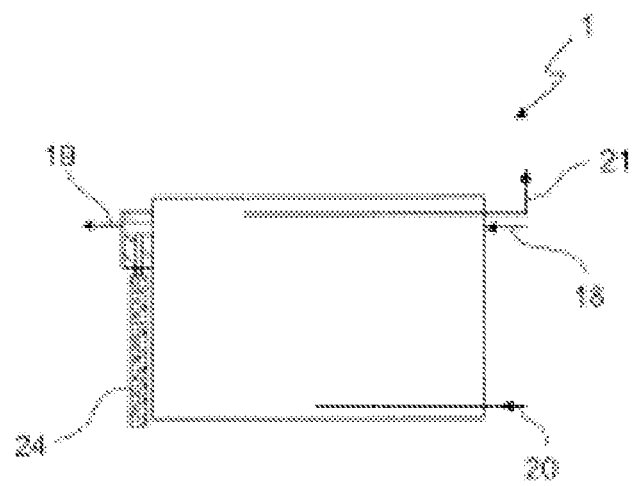
FIG. 9 illustrates the condenser cooled with liquid having a dryer.

FIG. 9 schematically illustrates the compact heat exchanger unit 1 having the refrigerant inlet 18 in the high-pressure state in the head of the condenser region (not specifically illustrated in the drawing). The coolant is introduced from the bottom of the compact heat exchanger unit 1 through the coolant inlet 20, and discharged from the head of the compact heat exchanger unit 1 through the coolant outlet 21 again. The specificity of the exemplary embodiment illustrated lies in the plate design of the dryer 24, the dryer is directly arranged in the compact heat exchanger unit 1, and the refrigerant outlet 19 in the high-pressure state is also arranged on the end of the head of the dryer. Therefore, the separate dryer 24 is formed in the state of being integrated into the compact heat exchanger unit 1, and such an integration method has the advantage of being implemented by the aforementioned structural separation formation in which the replacement possibility of the dryer 24 is not largely complicated.

The preferred flow formation of the coolant within the compact heat exchanger unit 1 is a single flow formation, but in this case, may also be implemented by the multiple flow formation having the compact heat exchanger unit 1.

The refrigerant flow is implemented by two flows, in which one flow is implemented by condensation and one flow is implemented by excess cooling, and in this case, the design of the multiple flow is also available. The preferred flow of the refrigerant during condensation is from the head to the bottom, and a double or triple pipe may be used to deliver the refrigerant within the delivery channel 17.

Figure 10:
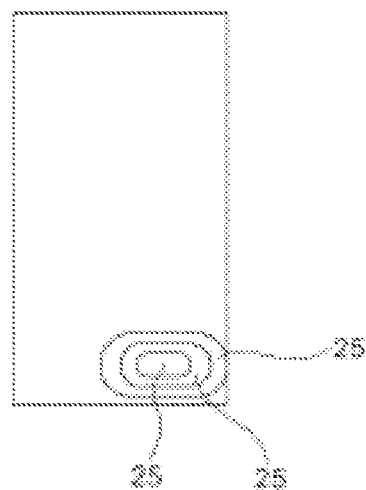
FIG. 10 illustrates a side diagram of a plate having a triple pipe as a channel.

FIG. 10 illustrates a side diagram of one plate of the plate heat exchanger. Three channels 25 going inside the hyperplane are illustrated in the lower region of the plate. These channels 25 are formed by one or more coaxial double pipes. The exemplary embodiment illustrated illustrates the triple pipe, and a total of three channels 25 illustrated in the drawing are formed inside the pipe having the minimum diameter by the triple pipe or between two additional pipes. Alternatively, the channels 25 may also be implemented in parallel with each other or as one segment. According to the exemplary embodiment, the channel 25 allows the fluid to flow through the plate packet or region even without using the pipe or the channel outside the plate heat exchanger. Therefore, the channel 25 is integrated inside the plate heat exchanger, such that a particularly compact component which prevents the erroneous assembling due to a fluid connection part sparely manufactured inside the heat exchanger and may be implemented very firmly is generated.

Figure 11:
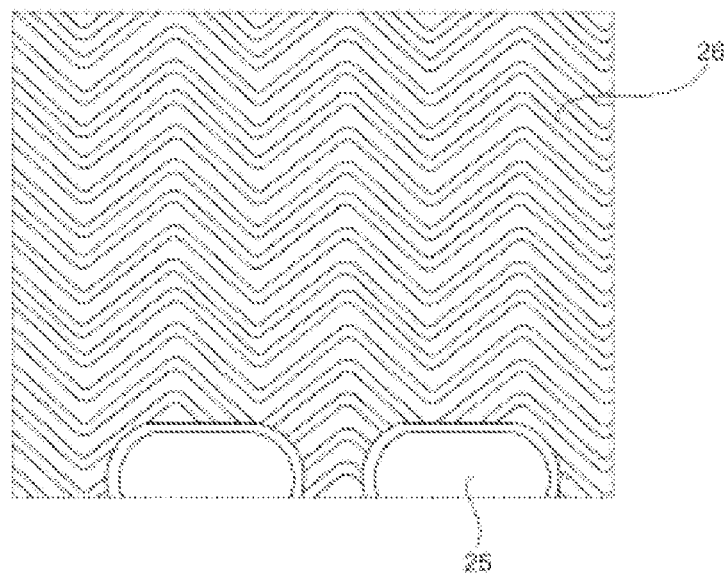
FIG. 11 illustrates a plate having a rib formed by a chevron-design.

FIG. 11 illustrates one plate of the plate heat exchanger having a rib 26, and in this case, two channels 25 may be shown in the lower region of the drawing. A structure of the rib 26 corresponds to the chevron-design also suitable for the high pressure.

Figure 12:
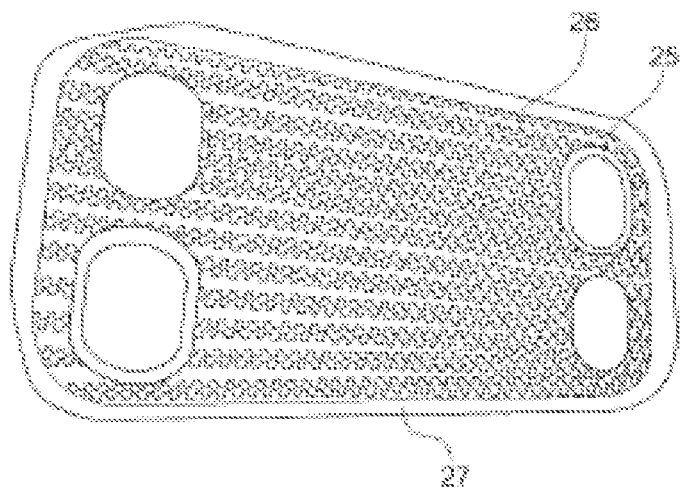
FIG. 12 illustrates a plate having a rib formed by an offset-design.

FIG. 12 illustrates one plate of the plate heat exchanger having the rib 26, and in this case, two channels 25 may be shown on the side surfaces of the rib 26, respectively. A structure of the rib 26 corresponds to the offset-design particularly suitable for the high pressure. The specificity is that the rib 26 formed by the offset-design is implemented by an insertion plate 27 inserted into and connected to two side plates of the plate heat exchanger, preferably, soldered or welded. The heat exchanging fluid flows through the insertion plate 27 between the side plates.

Figure 13:
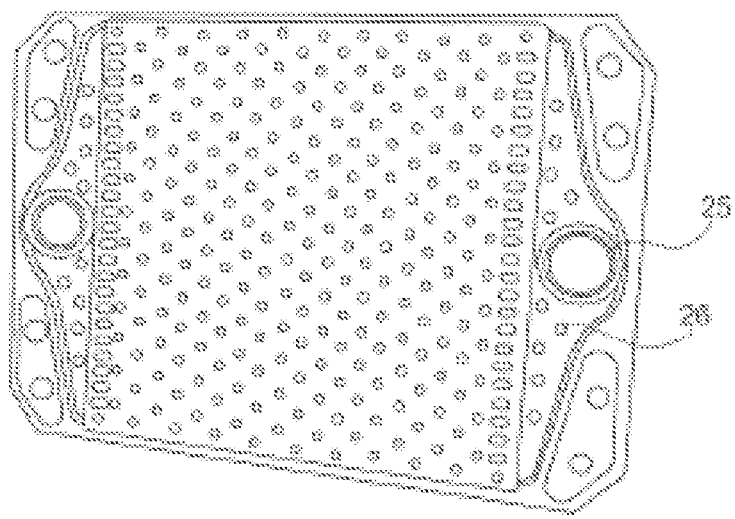
FIG. 13 illustrates a plate having a rib formed by a dimple-design.

FIG. 13 illustrates one plate of the plate heat exchanger having the rib 26 indicated by the dimple-design. This design is implemented as a ridge having a protrusion form of the plate connected to each of the neighboring plates. Therefore, a plurality of connection points also serving as the flow assembly appear over the surface of the plate. For example, the dimple-design may be used for a smaller pressure on the low-pressure side of the refrigerant circulation system.

FIGS. 14 to 17 exemplarily illustrate the preferred exemplary embodiments of the offset-design insertion plate 27 illustrated in FIG. 11 by the changed examples illustrated in each drawing. The insertion plate 27 has a recesses 28 enlarging the volume between the side plates. The recesses 28 are formed as a structure or a pattern within the insertion plate 27 within the integrated high-pressure-refrigerant collector region 5 of the compact heat exchanger unit. To have a sufficient large volume matching with the refrigerant storage inside the integrated high-pressure-refrigerant collector region, the recess is formed in the circular shape or the long hole shape, or by the snake design or the fir design.

Figure 14:
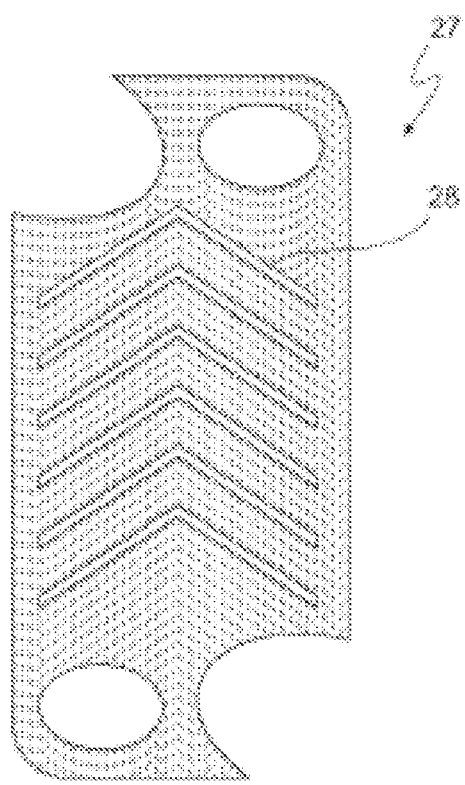
FIGS. 14 to 17 illustrate the plate having a recess and formed by the offset-design.

FIG. 14 illustrates the recesses 28 within the offset-design insertion plate 27 formed by the fir design. The recesses 28 are evenly distributed and arranged over the surface of the insertion plate 27 between fixing parts for the channel 25. The width of a gap between the recesses 28 is about 3 mm as illustrated.

Figure 15:
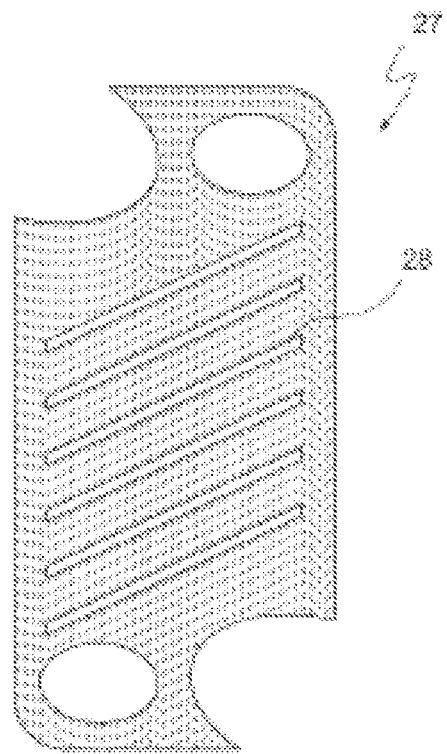

Likewise, FIG. 15 illustrates the recesses 28 within the offset-design insertion plate 27 as the channel having the width of about 3 mm and formed obliquely.

Figure 16:
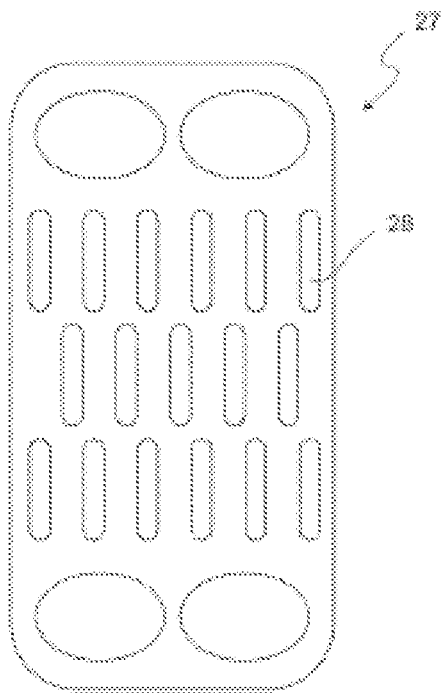

FIG. 16 illustrates the recesses 28 within the offset-design insertion plate 27 formed by the long hole design. Even in this case, the recesses 28 are evenly distributed and arranged over the surface of the insertion plate 27 between the fixing parts for the channel 25. The present exemplary embodiment shows the alignment in which the long holes are vertically displaced and arranged, and in this case, as the preferred alternative, there is the replacement alignment or the horizontal alignment.

Figure 17:
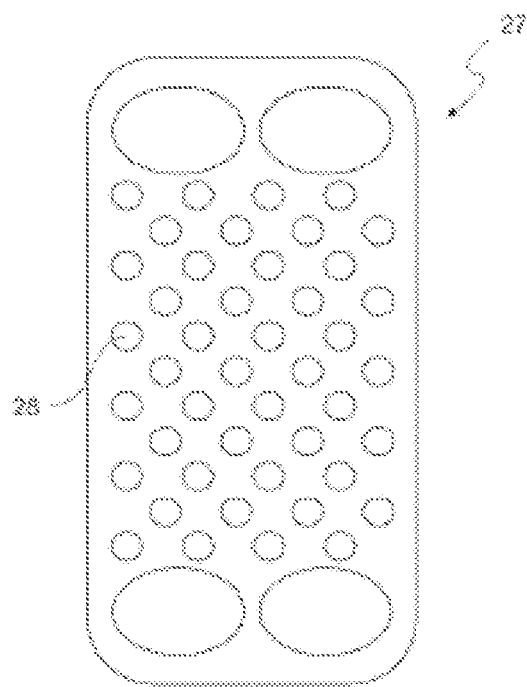

FIG. 17 illustrates the state where the circular recesses 28 within the offset-design insertion plate 27 are displaced and arranged in series.

INDUSTRIAL APPLICABILITY

The present disclosure relates to a compact heat exchanger unit and an air conditioning module particularly suitable for an electric vehicle due to its own configuration method, compactness, and connection conditions.

The air conditioning module may be understood as an apparatus for generating or providing the heat air and/or the cool air which conditions the air in a vehicle interior, as a portion of the air conditioning unit. The air conditioning module has all important components of a refrigerant circulation system and is designed in a special method to be used in an electric vehicle which preferably has the generally low level of the waste heat temperature and uses an electric compressor.

What is claimed is:

1. A compact heat exchanger unit within an air conditioning apparatus for a vehicle for condensation of refrigerant cooled with liquid, wherein a condenser region for the condensation of the refrigerant is formed as a heat exchanging surface, and a high-pressure-refrigerant collector region as a refrigerant collector is formed in integrated form as plate packets within a plate heat exchanger, wherein a separate excess cooling region for excess cooling of the refrigerant is connected after the condenser region, and integrated within the compact heat exchanger unit as the plate packet.

2. The compact heat exchanger unit of claim 1, wherein the condenser region, the excess cooling region, and the high-pressure-refrigerant collector region are arranged in parallel with each other as the plate packets of the plate heat exchanger, the refrigerant flows through the condenser region and then is guided and collected into the high-pressure-refrigerant collector region, and then guided to the excess cooling region to be excessively cooled.

3. The compact heat exchanger unit of claim 1, wherein the high-pressure-refrigerant collector region of the compact heat exchanger unit is formed to be charged and empty from a bottom thereof.

4. The compact heat exchanger unit of claim 1, wherein an evaporator region, an internal heat exchanger region, and the condenser region are formed as the plate packets, and integrated within an integrated plate heat exchanger.

5. The compact heat exchanger unit of claim 1, wherein a filter and/or a dryer and/or an expansion engine are integrated within the compact heat exchanger unit.

6. A compact heat exchanger unit within an air conditioning apparatus for a vehicle for condensation of refrigerant cooled with liquid, wherein a condenser region for the condensation of the refrigerant is formed as a heat exchanging surface, and a high-pressure-refrigerant collector region as a refrigerant collector is formed in integrated form as plate packets within a plate heat exchanger, wherein an evaporator region, an internal heat exchanger region, and the condenser region are formed as the plate packets, and integrated within an integrated plate heat exchanger, and wherein the evaporator region, the internal heat exchanger region, the condenser region, the condenser region and the high-pressure-refrigerant collector region of the compact heat exchanger unit are thermally insulated from each other, and insulation plates are arranged between the evaporator region, the internal heat exchanger region, the condenser region, the high-pressure-refrigerant collector region, and the condenser region.

7. The compact heat exchanger unit 1 of claim 4, wherein delivery channels are arranged between the evaporator region, the internal heat exchanger region, the condenser region, the high-pressure-refrigerant collector region, and the condenser region of the compact heat exchanger unit as the plate packets of the plate heat exchanger for guiding the refrigerant from a lower surface of the compact heat exchanger unit to an upper surface thereof.

8. The compact heat exchanger unit of claim 4, wherein the plate, the plate packets, and the evaporator region, the internal heat exchanger region, the condenser region, the high-pressure-refrigerant collector region, and the condenser region of the compact heat exchanger unit 1 are soldered together.

9. A compact heat exchanger unit within an air conditioning apparatus for a vehicle for condensation of refrigerant cooled with liquid, wherein a condenser region for the condensation of the refrigerant is formed as a heat exchanging surface, and a high-pressure-refrigerant collector region as a refrigerant collector is formed in integrated form as plate packets within a plate heat exchanger, wherein a plate of the plate heat exchanger has a rib, the rib is formed by an offset-design, a dimple-design, or a chevron-design, and the rib formed by the offset-design is implemented between two plates as an insertion plate.

10. The compact heat exchanger unit of claim 9, wherein the plate of the plate heat exchanger within the high-pressure-refrigerant collector region has the rib as the insertion plate formed by the offset-design, the insertion plate has a recess for enlarging a volume of the high-pressure-refrigerant collector region, the recess has a grain structure, a fir structure, or a long hole structure, and the insertion plate is connected to the plate through a plurality of contact points.

11. The compact heat exchanger unit of claim 10, wherein if the plates are arranged in parallel with each other, a structure of the insertion plate having the recess for enlarging the volume of the high-pressure-refrigerant collector region is replaced for improving a pressure strength.

12. The compact heat exchanger unit of claim 9, wherein the plate of the plate heat exchanger within the internal heat exchanger region has the rib formed by the dimple-design on a low pressure side, and has the rib as an insertion part formed by the offset-design on the high pressure side.

13. A compact heat exchanger unit within an air conditioning apparatus for a vehicle for condensation of refrigerant cooled with liquid, wherein a condenser region for the condensation of the refrigerant is formed as a heat exchanging surface, and a high-pressure-refrigerant collector region as a refrigerant collector is formed in integrated form as plate packets within a plate heat exchanger, wherein plates within the condenser region and an excess cooling region have a rib as an insertion part formed by an offset-design and/or the rib formed by a chevron-design.

14. The compact heat exchanger unit of claim 4, wherein a plate of the plate heat exchanger within the evaporator region has a rib formed by a dimple-design.

15. The compact heat exchanger unit of claim 6, wherein the plate packets of the evaporator region, the internal heat exchanger region, the condenser region, the high-pressure-refrigerant collector region, and the condenser region of the compact heat exchanger unit for flowing through fluid have a section having a double, triple, or quadruple pipe as a channel.

* * * * *